United States Patent [19]

Volker et al.

[11] 3,919,236

[45] Nov. 11, 1975

[54] PROCESS FOR THE PRODUCTION OF HYDROQUINOLINES

[75] Inventors: Theodor Volker; Klaus Hering, both of Fribourg; Edouard Dallwigk, Visp, all of Switzerland

[73] Assignee: Lonza Ltd., Gampel, Switzerland

[22] Filed: Feb. 7, 1973

[21] Appl. No.: 330,285

Related U.S. Application Data

[63] Continuation-in-part of Ser. No. 82,805, Oct. 21, 1970, abandoned.

[30] Foreign Application Priority Data

Oct. 23, 1969 Switzerland.................... 15801/69

[52] U.S. Cl. ......................... 260/283 R; 260/287 R
[51] Int. Cl.² ....................................... C07D 215/06
[58] Field of Search .................. 260/283 R, 287 R

[56] References Cited
UNITED STATES PATENTS

| | | | |
|---|---|---|---|
| 2,166,118 | 7/1939 | Bousquet et al. | 260/287 R |
| 2,395,526 | 2/1946 | Woodward | 260/287 R |
| 3,247,209 | 4/1966 | Schmerling | 260/283 R |
| 3,501,478 | 3/1970 | Grethe et al. | 260/287 R |
| 3,539,578 | 11/1970 | Brown | 260/287 R |

FOREIGN PATENTS OR APPLICATIONS

| | | | |
|---|---|---|---|
| 984,361 | 2/1965 | United Kingdom | 260/283 R |

OTHER PUBLICATIONS

Hickel et al.: Chemical Abstracts; Vol. 52; 9121a; 1957.
Akabori et al.; Proc. Imp. Acad. (Tokyo), Vol. 5, 1929, pp. 255–256.

*Primary Examiner*—Donald G. Daus
*Assistant Examiner*—Mary C. Vaughn
*Attorney, Agent, or Firm*—Cooper, Dunham, Clark, Griffin & Moran

[57] ABSTRACT

Production of tetrahydroquinolines and tetrahydroisoquinolines including N-acyl, N-methyl and N-ethyl substituted derivatives thereof by reaction of the corresponding quinoline and isoquinoline compounds with lower carboxylic acids or mixtures of the such lower carboxylic acids and their lower alkyl esters at elevated temperatures, preferably under autogenous pressure.

9 Claims, No Drawings

PROCESS FOR THE PRODUCTION OF HYDROQUINOLINES

RELATED APPLICATION

This application is a Continuation-in-part Application of copending application Ser. No. 82,805 filed Oct. 21, 1970, now abandoned.

BACKGROUND OF INVENTION

The invention relates to a process for the production of hydroquinolines which may be substituted on the nitrogen atom by acyl, methyl or ethyl radicals.

It is known that quaternary pyridine bases can be reduced with formic acid. The reduction of 1,2,6-trimethylpyridinium formate, with formic acid is described in Coll. Czech. Chem. Commun., Vol. 19 (1954). Besides the corresponding tetrahydro- and hexahydropyridine bases, neutral compounds are formed in the reduction.

THE INVENTION

It has now been discovered that hydroquinolines (as used herein the terms hydroquinolines and quinolines include both of the corresponding isoquinoline type compounds) can be produced directly from quinolines by heating them together with lower monocarboxylic acids and lower alkyl esters of such acids. The reactants and the reaction conditions can be selected so as to produce only N-unsubstituted tetrahydroquinolines or varying amounts of N-formyl, N-acetyl, N-methyl and N-ethyl tetrahydroquinolines. In fact, by selecting suitable reaction conditions the reaction product can be one which contains only negligible amounts of N-unsubstituted products. The carbon atoms of the ring structure to be reduced can be substituted with any of a variety of reaction inert substituents such as one or more lower alkyl radicals.

The reaction is carried out at a temperature of from 160° to 280°C. for from about 1 to 10 hours, preferably in a closed vessel at autogenous pressure, by reacting the starting compound with a carboxylic acid containing 1 to 4 carbon atoms, with a mixture of such acids, or with an acid or acid mixture additionally containing a methyl or ethyl ester of one or more of said acids. Typical starting materials include quinoline, isoquinoline, lower alkyl substituted derivatives thereof in which an alkyl substituent contains up to about 6 carbon atoms, and acid addition salts of such compounds, especially mineral acid addition salts such as the hydrochloride salt.

Suitable carboxylic acids include straight chain alkanoic acids or anhydrides containing up to 4 carbon atoms. With these acids different tetrahydroquinolines are produced. With acids containing 3 to 4 carbon atoms mainly N-unsubstituted compounds are produced. With acids containing 2 carbon atoms, mixtures of N-substituted and N-unsubstituted compounds are produced. The more rigorous the conditions, the more of the substituted compounds will be produced. For example, at higher temperatures and longer times within the above defined ranges the predominant products are N-substituted compounds.

Besides the acids alone there may also be used mixtures of the aforesaid acids with their methyl or ethyl esters. Where esters are used, these can be directly formed in situ from the corresponding acid and alcohol, viz. methanol and ethanol. Higher alcohols do not produce N-alkyl compounds. The methyl esters of formic acid and acetic acid are preferably used. It is also possible to use mixtures of the aforesaid acids, their anhydrides and esters. Mixtures of different N-substituted products are formed in this case.

The carboxylic acid or its mixture with the ester is expediently used in excess. Preferably, 3 to 30 mols of acid or ester are used per mol of starting material. If a mixture of carboxylic acid and its lower ester is used, the N-acyl product and the N-methyl product or N-ethyl product are formed, in addition to the hydroquinoline. As the amount of ester in the starting mixture increases, the composition of the reaction product is shifted towards increased N-methyl or -ethyl products.

The reaction may be carried out in a solvent. Typically useful solvents include aromatic hydrocarbons such as benzene, alcohols containing three or more carbon atoms, esters other than those described above as reactants, hydrocarbons ketones and water. If acetone is used as a solvent, it has been observed that in addition to the reaction products described above, appreciable quantities of octahydroquinolines are produced.

As stated above, the amount of N-acyl compounds in the final product can be increased by carrying out the reaction under more vigorous conditions. If desired, the tetrahydroquinoline products can be converted to N-acyl compounds, subsequent to isolation from the original reaction mixture, by reaction with additional alkanoic acid. The N-acyl compounds can be converted to N-methyl or ethyl compounds by reaction with methyl or ethyl alcohol.

The products produced by the invention can be employed for a variety of purposes. They are, for example, useful as reaction solvents, especially reactions requiring alkaline catalysis or neutralization of an acid by-product, for example acylation reactions utilizing acyl halides or anhydrides as the acylating agent.

U.S. Pat. No. 2,395,526 describes the use of N-acetyl-1,2,3,4-tetrahydro-7-hydroxy-8-methyl isoquinoline in the preparation of quinine and cinchona alkaloids.

British Pat. No. 984,361 describes the pharmaceutical activity of quaternary ammonium salts of 1,2,3,4-tetrahydroisoquinoline and their preparation from the corresponding N-methyl and N-ethyl compounds which may be prepared in accordance with this invention.

The quaternization process described in the British patent can be used to produce quaternary compounds from the N-alkylated products of this invention. These compounds are cationically active and therefore useful as surfactants. Quaternary salts with at least one long chain alkyl substituent, for example containing twelve or more carbon atoms are especially useful in this respect.

The following non-limiting examples are given by way of illustration only.

EXAMPLE 1

6.5 g (0.05 mole) quinoline were placed with 3.7 g (0.05 mol) propionic acid and 45.0 g (0.75 mol) formic acid methyl ester into an autoclave of 100 ml useful capacity and heated at 240°C. for 7 hours. The pressure rose to 100 atm. excess pressure within 5 hours so that the temperature had to be reduced during the last 2 hours, first to 220°C. for 1 hour and then to 200°C. for 1 hour.

After cooling, the residual pressure in the autoclave amounted to 32 atm. excess pressure. Upon blowing off with the aid of barium hydroxide solution, barium carbonate was precipitated and the weight increase amounted to 5.2 g = 0.12 mol $CO_2$.

After distilling off the excess of formic acid methyl ester and the propionic acid in a rotary evaporator, there were obtained 7.2 g of crude product which, according to analysis by gas chromatography, contained 59.1% tetrahydroquinoline. The yield amounted to 64.0% of theory, referred to the starting quinoline. The mix also contained appreciable amounts of N-methyl and N-formyl tetrahydroquinoline.

A higher yield can be expected when the reaction is carried out with larger amounts in a high pressure autoclave.

When the same reaction was carried out except for replacement of the formic acid methyl ester with the same amount of propionic acid, no essential amounts of N-substituted products were produced.

When the same reaction was carried out except for the replacement of the propionic acid with the same amount of formic acid methyl ester the amount of tetrahydroquinoline produced decreased, but the amounts of N-formyl tetrahydroquinoline and N-methyl tetrahydroquinoline produced increased.

EXAMPLE 2

12.9 g (0.1 mol) quinoline were introduced with 23.0 g (0.5 mol) formic acid and 50 ml acetone (solvent) into an autoclave with a useful capacity of 100 ml and heated at 200°C. for 3 hours. The pressure rose to 50 at. The autoclave was cooled to room temperature after 3 hours. The pressure then amounted to 16 at. After release of the pressure, the acetone was distilled off from the reaction mixture in a rotary evaporator at 40°C. in a vacuum. The remaining crude product (15.3 g) contained 16.8% 1,2,3,4-tetrahydroquinoline, 16.45% octahydroquinoline and 66.8% N-formyl-1,2,3,4-tetrahydroquinoline (determined by gas chromatography). The yield of N-formyl-1,2,3,4-tetrahydroquinoline, referred to the starting quinoline, amounted to 63.5%. To prepare pure N-formyl-1,2,3,4-tetrahydroquinoline, the crude product was distilled in a vacuum (column with steel helix), and the N-formyl-1,2,3,4-tetrahydroquinoline was isolated in a yield of 53.4%, referred to the starting quinoline. The b.p. was 94°-95°C. at 0.35 mm Hg, the m.p. was 34°-35°C.

Similar results were obtained when the quinoline was replaced with an equivalent quantity of isoquinoline.

EXAMPLE 3

12.9 g (0.1 mol) quinoline were heated together with 23.0 g (0.5 mol) formic acid and 50.0 g (0.833 mol) formic acid methyl ester in an autoclave (100 ml) at 200°C. for 7 hours. The pressure rose to about 90 at. After working up the reaction product, there were obtained 15.7 g of crude product containing 28.7% N-methyl-1,2,3,4-tetrahydroquinoline and 71.3% N-formyl-1,2,3,4-tetrahydroquinoline.

The two products were separated by distillation in a vacuum. The N-formyl-1,2,3,4-tetrahydroquinoline was thus obtained in a yield of 67.9%, referred to the starting quinoline. The b.p. was 94°-95°C. at 0.35 mm Hg; the b.p. of the N-methyl-1,2,3,4-tetrahydroquinoline was 57°-58°C. at 0.4 mm Hg.

EXAMPLE 4

12.9 g (0.1 mol) quinoline were reacted with 23.0 g (0.5 mol) formic acid and 50.0 g (0.677 mol) acetic acid methyl ester at 200°C. for 7 hours. The pressure rose to 43 at. After working up, there were obtained 16.1 g of crude product consisting of 7.7% tetrahydroquinoline, 12.3% N-methyl-1,2,3,4-tetrahydroquinoline and 80.0% N-formyl-1,2,3,4-tetrahydroquinoline. The yield of N-formyl-tetrahydroquinoline amounted to 80%.

EXAMPLE 5

12.9 g (0.1 mol) quinoline were heated in an autoclave with 23.0 g (0.5 mol) formic acid and 12.2 g (0.12 mol) acetic acid anhydride in the presence of 50 g acetone as solvent at 240°C. for 3 hours. After working up, there resulted 14.9 g of crude product of the following composition:

12.9% 1,2,3,4-tetrahydroquinoline
53.4% N-formyl-1,2,3,4-tetrahydroquinoline
12.9% N-acetyl-1,2,3,4-tetrahydroquinoline
21.0% Octahydroquinoline The yield amounted to 49.5% N-formyl- and 11.0% of N-acetyl-1,2,3,4-tetrahydroquinoline.

EXAMPLE 6

6.5 g (0.05 mol) isoquinoline were heated with 11.5 g (0.25 mol) formic acid and 25.0 g (0.416 mol) formic acid methyl ester at 180°C. for 7 hours. The reaction took a vigorous course and was controlled by occasional cooling and reducing the pressure to 90 at. After working up, there were obtained 8.9 g of residue containing 26.7% 1,2,3,4-tetrahydroquinoline, 71.2% N-formyl-1,2,3,4-tetrahydroisoquinoline and a small amount of N-methyl-1,2,3,4,tetrahydroisoquinoline. The yield of N-formyl product amounted to 79.3%. The b.p. was 110°C. at 0.4 mm Hg.

EXAMPLE 7

14.8 g (0.1 mol) 8-methyl-quinoline were reacted with 23.0 g (0.5 mol) formic acid and 50.0 g (0.833 mol) formic acid methyl ester at 200°C. for 7 hours. The 17.4 g of crude product contained 17.6% 1,2,3,4-tetrahydro-8-methyl-quinoline, 6.5% N-methyl-1,2,3,4-tetrahydro-8-methyl-quinoline and 75.8% N-formyl-1,2,3,4-tetrahydro-8-methyl-quinoline. The yield of N-formyl product was 75.3%; the b.p. was 91°C. at 0.2 mm Hg.

EXAMPLES 8-16

The following examples, in each of which the starting product was 0.1 mol of quinoline, illustrate the effects of changes in temperature, time and reaction mixture.

TABLE

| carboxylic acid | | low ester | | solvent | | reaction time | reaction temp. | reaction product gram | % analysis | | |
|---|---|---|---|---|---|---|---|---|---|---|---|
| mole | type | mole | type | mole | type | | | | I | II | III |
| 0.5 | AS | — | — | 0.5 | AMBV | 7 h | 200 | 16.1 | 1.9 | — | 97.0 |
| 0.5 | AS | — | — | 0.5 | B | 7 h | 200 | 16.0 | 2.3 | — | 95.6 |

TABLE-continued

| carboxylic acid | | low ester | | solvent | | reaction time | reaction temp. | reaction product gram | % analysis | | |
|---|---|---|---|---|---|---|---|---|---|---|---|
| mole | type | mole | type | mole | type | | | | I | II | III |
| 0.5* | AS | — | — | 2.5 | H₂O | 7 h | 200 | 15.9 | 10.7 | — | 89.3 |
| 0.5 | AS | 0.1 | AMME | — | — | 3 h | 200 | — | 15.0 | 3.6 | 56.3 |
| 0.5 | AS | 0.677 | ESME | — | — | 7 h | 200 | 16.1 | 7.7 | 12.35 | 80.0 |
| 0.5 | AS | 0.883 | AMME | — | — | 7 h | 200 | — | — | 39.6 | 60.4 |
| {0.5 | AS | 1.0 | ME | — | — | 7 h | 240 | 13.8 | 2.8 | 81.4 | 15.8 |
| {0.1 | PS | | | | | | | | | | |
| 0.1 | AS | 1.5 | AMME | — | — | 7 h | 240 | 14.2 | 22.6 | 59.7 | 10.35 |
| 0.1 | ES | 1.5 | AMME | — | — | 7 h | 240 | 14.0 | 7.9 | 84.0 | 6.7 |

AS = formic acid  
ES = acetic acid  
PS = propionic acid  
AMME = Methyl formate  
AMBV = Butyl formate  
ESME = Methyl acetate  
ME = methyl alcohol  
B = benzene  
I = tetrahydroquinoline  
II = N-methyl tetrahydroquinoline  
III = N-formyl tetrahydroquinoline  
* = quinoline hydrochloride

What is claimed is:

1. A process for the production of tetrahydroquinoline compounds in which the corresponding quinoline compound is reacted with a carboxylic acid having from 1 to 4 carbon atoms or an anhydride thereof in the presence or absence of methyl or ethyl formate or acetate or a solvent at a temperature of from about 160° to 280° for from about 1 to 10 hours to produce a product mixture containing such compounds.

2. A process as in claim 1 wherein the acid in the reaction mixture has from 1 to 2 carbon atoms and the product mixture additionally has an N-acyl tetrahydroquinoline wherein the acyl group has from 1 to 2 carbon atoms.

3. A process as in claim 1 wherein the reaction mixture additionally has a methyl or ethyl ester of a carboxylic acid having from 1 to 2 carbon atoms and the product mixture additionally has an N-methyl or N-ethyl tetrahydroquinoline.

4. A process as in claim 1 wherein the acid is formic acid and the product mixture additionally has an N-formyl tetrahydroquinoline.

5. A process as in claim 1 wherein the acid is acetic acid or its anhydride and the reaction mixture additionally has N-acetyl tetrahydroquinoline.

6. A process as in claim 4 wherein the reaction mixture additionally has at least one of methyl or ethyl formate or acetate and the product mixture additionally has at least one of an N-methyl or N-ethyl tetrahydroquinoline.

7. A process as in claim 5 wherein the reaction mixture additionally has at least one of methyl or ethyl formate and the product mixture additionally has an N-formyl tetrahydroquinoline together with at least one of an N-methyl or N-ethyl tetrahydroquinoline.

8. A process as in claim 1 wherein the acid has from 3 to 4 carbon atoms and the product mixture is free from N-substituted tetrahydroquinolines.

9. A process as in claim 1 wherein the reaction mixture has acetone as solvent and the product mixture additionally has an octahydroquinoline.

* * * * *